US012710674B2

(12) United States Patent
Jeon et al.

(10) Patent No.: US 12,710,674 B2
(45) Date of Patent: Aug. 18, 2026

(54) DISPLAY APPARATUS

(71) Applicant: SAMSUNG ELECTRONICS CO., LTD., Suwon-si (KR)

(72) Inventors: Dukjin Jeon, Suwon-si (KR); Ajeong Kang, Suwon-si (KR); Yeonkyun Park, Suwon-si (KR); Sunghee Wi, Suwon-si (KR); Youngmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/012,526

(22) Filed: Jan. 7, 2025

(65) Prior Publication Data

US 2025/0258405 A1 Aug. 14, 2025

Related U.S. Application Data

(63) Continuation of application No. PCT/KR2024/020940, filed on Dec. 23, 2024.

(30) Foreign Application Priority Data

Feb. 13, 2024 (KR) ........................ 10-2024-0020687
Apr. 8, 2024 (KR) ........................ 10-2024-0047669

(51) Int. Cl.
*G02F 1/13357* (2006.01)
*G02F 1/1335* (2006.01)

(52) U.S. Cl.
CPC .. *G02F 1/133605* (2013.01); *G02F 1/133608* (2013.01); *G02F 1/133611* (2013.01); *G02F 1/133613* (2021.01)

(58) Field of Classification Search
CPC ......... G02F 1/133605; G02F 1/133608; G02F 1/133611; G02F 1/133613; G02F 1/133603
See application file for complete search history.

(56) References Cited

U.S. PATENT DOCUMENTS 7,635,194 B2 12/2009 Kim et al.
8,305,516 B2 11/2012 Cho et al.
(Continued)

FOREIGN PATENT DOCUMENTS

KR 10-2010-0080024 A 7/2010
KR 10-1318302 B1 10/2013
(Continued)

OTHER PUBLICATIONS

International Search Report and Written Opinion dated Apr. 16, 2025, issued by the International Searching Authority in International Application No. PCT/KR2024/020940.

*Primary Examiner* — Evan P Dzierzynski
(74) *Attorney, Agent, or Firm* — Sughrue Mion, PLLC

(57) ABSTRACT

A display apparatus includes a reflective sheet, a light source substrate on the reflective sheet and including a first light source substrate and a second light source substrate, and a plurality of light sources including a plurality of first light sources on the first light source substrate and a plurality of second light sources on the second light source substrate. A first distance between a first light source of the plurality of first light sources and a second light source of the plurality of second light sources is greater than or equal to two times a second distance and less than or equal to four times the second distance. The second distance is a distance between adjacent first light sources of the plurality of first light sources.

18 Claims, 10 Drawing Sheets

(56) References Cited

U.S. PATENT DOCUMENTS

| | | | | |
|---|---|---|---|---|
| 10,032,392 | B2 | 7/2018 | Song et al. | |
| 10,254,585 | B2 | 4/2019 | Shin et al. | |
| 11,340,650 | B2 | 5/2022 | Kim et al. | |
| 11,366,355 | B2 | 6/2022 | Kim et al. | |
| 11,768,402 | B2 | 9/2023 | Kim et al. | |
| 2014/0016340 | A1* | 1/2014 | Cho | F21S 41/19<br>362/249.14 |
| 2015/0230305 | A1 | 8/2015 | Yoon et al. | |
| 2017/0219881 | A1* | 8/2017 | Shin | G02F 1/133608 |
| 2021/0011511 | A1* | 1/2021 | Kim | G06F 1/203 |
| 2021/0116750 | A1* | 4/2021 | Kim | G02F 1/133606 |
| 2023/0420620 | A1 | 12/2023 | Jang et al. | |

FOREIGN PATENT DOCUMENTS

| | | | |
|---|---|---|---|
| KR | 10-2014-0066899 | A | 6/2014 |
| KR | 10-2014-0118440 | A | 10/2014 |
| KR | 10-2017-0091290 | A | 8/2017 |
| KR | 10-2018-0058117 | A | 5/2018 |
| KR | 10-2021-0006111 | A | 1/2021 |
| KR | 10-2021-0047204 | A | 4/2021 |
| KR | 10-2023-0015239 | A | 1/2023 |
| KR | 10-2601736 | B1 | 11/2023 |
| KR | 10-2024-0001001 | A | 1/2024 |

* cited by examiner 15
15b
15a
120
127
121
126
122
110
113
118
115
111
116
110
150
112
117
110

DISPLAY APPARATUS

CROSS REFERENCE TO RELATED APPLICATION(S)

This application is a continuation of International Application No. PCT/KR2024/020940, filed on Dec. 23, 2024, in the Korean Intellectual Property Receiving Office, which is based on and claims priority to Korean Patent Application No. 10-2024-0020687, filed on Feb. 13, 2024, and Korean Patent Application No. 10-2024-0047669, filed on Apr. 8, 2024 in the Korean Intellectual Property Office, the disclosures of which are incorporated by reference herein in their entireties.

BACKGROUND

1. Field

The present disclosure relates to a display apparatus including a reflective sheet.

2. Description of Related Art

A display apparatus is a type of output device that converts acquired or stored electrical information into visual information and displays the converted visual information to a user, and is used in various fields such as homes and businesses.

Display apparatuses include monitor devices connected to personal computers or server computers, portable computer devices, navigation terminal devices, general television devices, Internet Protocol television (IPTV) devices, portable terminal devices such as smart phones, tablet PCs, personal digital assistants (PDAs), and cellular phones, various display apparatuses used in industrial settings to play back images such as advertisements and movies, or various types of audio/video systems.

A display apparatus includes a light source module to convert electrical information into visual information, and the light source module includes a plurality of light sources to independently emit light.

Each of the plurality of light sources includes, for example, a light emitting diode (LED) or an organic light emitting diode (OLED). For example, the light emitting diode or the organic light emitting diode may be mounted on a circuit board or substrate.

SUMMARY

Provided is a display apparatus which may have improved ease of assembly.

Further, provided is a display apparatus which may have improved brightness.

Further, provided is a display apparatus which may have reduced material costs.

Technical tasks to be achieved in this document are not limited to the technical tasks mentioned above, and other technical tasks not mentioned will be clearly understood by those skilled in the art from the description below.

A display apparatus according to an aspect of the present disclosure includes a reflective sheet, a light source substrate on the reflective sheet and including a first light source substrate and a second light source substrate, and a plurality of light sources including a plurality of first light sources on the first light source substrate and a plurality of second light sources on the second light source substrate. A first distance between a first light source of the plurality of first light sources and a second light source of the plurality of second light sources is greater than or equal to two times a second distance and less than or equal to four times the second distance. The second distance is a distance between adjacent first light sources of the plurality of first light sources.

A display apparatus according to an aspect of the present disclosure includes a bottom chassis, a reflective sheet disposed in front of the bottom chassis, a first light source substrate disposed in front of the reflective sheet, a second light source substrate disposed in front of the reflective sheet and arranged in an up-down direction with the first light source substrate, a plurality of first light sources mounted on the first light source substrate, and a plurality of second light sources mounted on the second light source substrate. A closest first distance among distances between one of the plurality of first light sources and one of the plurality of second light sources is set to be two times to four times a second distance between the plurality of first light sources.

DETAILED DESCRIPTION

Figure 1:
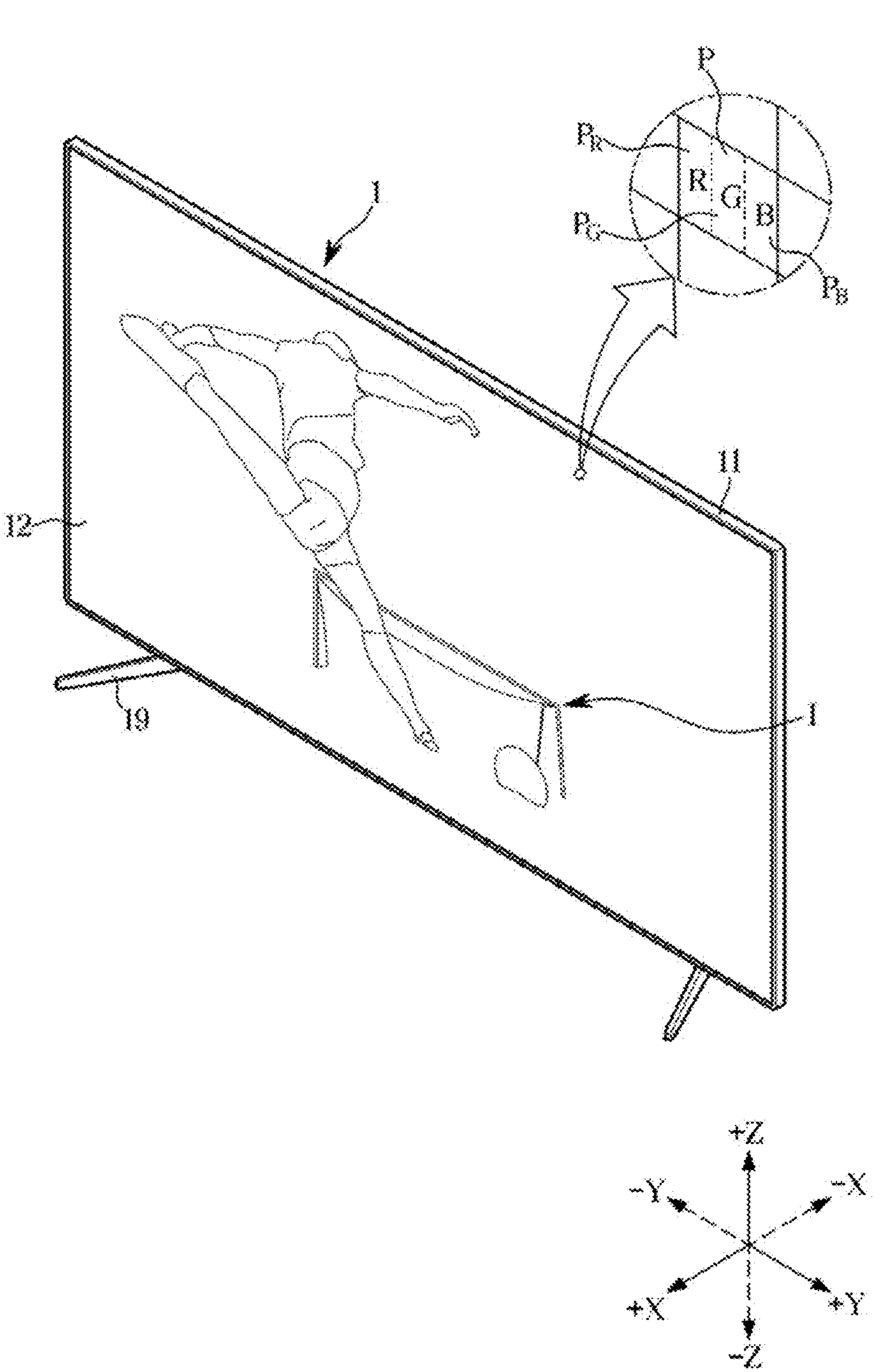
FIG. 1 illustrates a display apparatus according to an embodiment of the present disclosure.

The embodiments described in the present disclosure and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the present disclosure represent parts or components that perform substantially the same functions.

The singular form of a noun corresponding to an item may include one item or a plurality of items, unless the relevant context clearly dictates otherwise.

In this document, each of phrases such as "A or B," "at least one of A and B," "at least one of A or B," "A, B or C," "at least one of A, B and C," and "at least one of A, B, or C" may include any one of the items listed together in the corresponding one of the phrases, or all possible combinations thereof.

The terms "unit," "module," and "member" may be implemented as hardware or software. Depending on embodiments, a plurality of "units," "modules," and "members" may be implemented as one component, or one "unit," "module," and "member" may include a plurality of components.

The terms used in this specification are for the purpose of describing the embodiments and are not intended to restrict and/or to limit the present disclosure. For example, the singular expressions herein may include plural expressions, unless the context clearly dictates otherwise. Also, the terms "comprises" and "has" in this specification are intended to indicate that there are features, numbers, steps, operations, components, parts, or combinations thereof described in the specification, and do not exclude the presence or addition of one or more other features, numbers, steps, operations, components, parts, or combinations thereof.

It will be understood that, although terms including ordinal numbers, such as "first," "second," etc., used in this specification may be used to describe various components, these components should not be limited by these terms, and the terms are only used to distinguish one from another component. For example, without departing from the scope of the present disclosure, a first component may be referred to as a second component, and similarly, the second component may also be referred to as a first component. The term "and/or" includes any combination of a plurality of related items or any one of a plurality of related items.

When any (e.g., a first) component is referred to as being "coupled" or "connected" to another (e.g., a second) component with or without the terms "functionally" or "communicatively", this means that the any component may be connected to the other component directly (e.g., by a wire), wirelessly, or through a third component.

When any component is referred to as being "connected," "coupled," "supported" or "in contact" with another component, this includes a case in which the components are indirectly connected, coupled, supported, or in contact with each other through a third component as well as directly connected, coupled, supported, or in contact with each other.

When any component is referred to as being located "on" or "over" another component, this includes not only a case in which any component is in contact with another component but also a case in which another component is present between the two components.

The terms "up-down direction," "front-rear direction," etc., used in the description below are defined based on the drawing, and the shape and position of each component are not limited by these terms. For example, the terms "front" and "rear" below may each be defined based on an X direction shown in the drawings. The terms "front" and "rear" below may each be defined based on a Z direction shown in the drawings. The terms "left direction" and "right direction" below may each be defined based on a Y direction shown in the drawings. The term "vertical direction" below may refer to a Z direction shown in the drawings, and the term "horizontal direction" below may refer to a Y direction shown in the drawings.

Hereinafter, embodiments according to the present disclosure will be described in detail with reference to the accompanying drawings.

FIG. 1 illustrates a display apparatus according to an embodiment of the present disclosure.

Referring to FIG. 1, a display apparatus 1 according to an embodiment of the present disclosure is a device capable of processing an image signal received from the outside and visually displaying the processed image. FIG. 1 illustrates a case in which the display apparatus 1 is a television (TV), but is not limited thereto. For example, the display apparatus 1 may be implemented in various forms such as a monitor, which is a type of computer output device, a portable multimedia device, a portable communication device, etc., and the form of the display apparatus 1 is not limited as long as the display apparatus is a device that visually displays an image.

In addition, the display apparatus 1 may be a large display apparatus (large format display, LFD) installed outdoors, such as on a building rooftop and at a bus stop. Herein, the outdoors is not necessarily limited to outdoors, and the display apparatus 1 according to an embodiment of the present disclosure may be installed in any indoor location where many people may come and go, such as a subway station, a shopping mall, a movie theater, a company, and a store.

FIG. 1 illustrates an example in which the display apparatus 1 is a flat display apparatus having a flat screen, but is not limited thereto, and the display apparatus according to the present disclosure may be applied to a curved display apparatus or a bendable or flexible display apparatus capable of being changed between a flat state and a curved state. In addition, the configuration according to the present disclosure may be applied to display apparatuses of various shapes regardless of a screen size or ratio of the display apparatus.

The display apparatus 1 may receive content including video signals and audio signals from various content sources, and output video and audio corresponding to the video signals and audio signals. For example, the display apparatus 1 may receive content data via a broadcast receiving antenna or a wired cable, receive content data from a content playback device, or receive content data from a content provision server of a content provider.

The display apparatus 1 may display images corresponding to video data and output sounds corresponding to audio data. For example, the display apparatus 1 may restore a plurality of image frames included in the video data and continuously display the plurality of image frames. In addition, the display apparatus 1 may restore audio signals included in the audio data and continuously output sounds according to the audio signals.

As illustrated in FIG. 1, the display apparatus 1 may include a main body 11 and a screen 12 displaying an image I.

The display apparatus 1 may be installed in a standing manner on an indoor or outdoor floor or furniture, or in a wall-mounted manner on a wall or inside a wall. As an example, the display apparatus 1 may include support legs 19 provided at a lower portion of the main body 11 so that the display apparatus may be installed in a standing manner on an indoor or outdoor floor or furniture.

The main body 11 may form an outer shape of the display apparatus 1. Inside the main body 11, components for performing various functions, such as the display apparatus 1 displaying the image I, may be provided.

The display apparatus 1 may be configured to display the image I. For example, the screen 12 may be formed in a front surface of the main body 11, and the display apparatus 1 may display the image I through the screen 12. For example, the screen 12 may display a still image or a moving image. In addition, the screen 12 may display a two-dimensional flat image or a three-dimensional stereoscopic image using a parallax between two eyes of the user.

A plurality of pixels P may be formed on the screen 12. The image I displayed on the screen 12 may be formed by light emitted by each of the plurality of pixels P. For example, the image I on the screen 12 may be formed by combining light emitted from the plurality of pixels P like a mosaic.

The plurality of pixels P may each emit light of various brightness and various colors. For example, each of the plurality of pixels P may include sub-pixels PR, PG, and PB, and the sub-pixels PR, PG, and PB may include the red sub-pixel PR capable of emitting red light, the green sub-pixel PG capable of emitting green light, and the blue sub-pixel PB capable of emitting blue light. For example, red light may represent light with a wavelength from about 620 nm (nanometer, one billionth of a meter) to 750 nm, green light may represent light with a wavelength from about 495 nm to 570 nm, and blue light may represent light with a wavelength from about 450 nm to 495 nm.

By combining the light emitted from the red sub-pixel PR, the green sub-pixel PG, and the blue sub-pixel PB, the plurality of pixels P may each emit light of various brightness and various colors.

Figure 2:
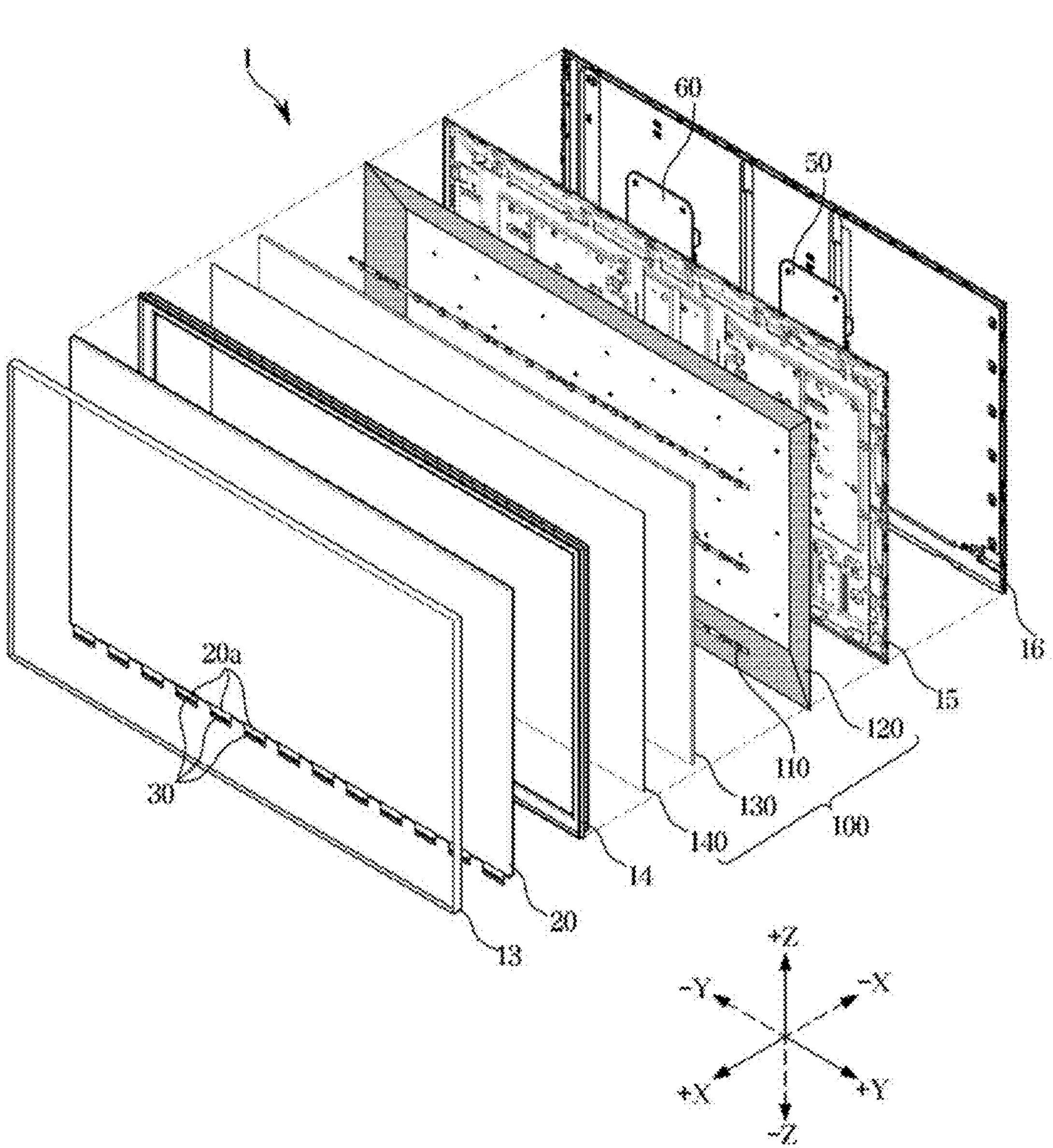
FIG. 2 is an exploded view of the display apparatus according to an embodiment of the present disclosure.

FIG. 2 is an exploded view of the display apparatus according to an embodiment of the present disclosure.

Referring to FIG. 2, various components for generating the image I on the screen 12 may be provided inside the main body 11 of the display apparatus 1 according to an embodiment of the present disclosure.

For example, the display apparatus 1 may include a display panel 20. The display panel 20 may be provided in the main body 11. The display panel 20 may be configured to display the image I. The screen 12 illustrated in FIG. 1 may be formed on a front surface of the display panel 20.

As an example, the display panel 20 may have a substantially rectangular shape. For instance, the display panel 20 may have a shape in which a length of a horizontal side and a length of a vertical side are different from each other. That is, the display panel 20 may be configured to have a long side and a short side. The display panel 20 may be provided in a rectangular plate shape. However, the present disclosure is not limited thereto, and the display panel 20 may be provided in a square plate shape with the long side and the short side having almost the same length.

The display panel 20 may be provided in various sizes. A ratio between the long side and the short side of the display panel 20 is not limited to general cases such as 16:9 and 4:3, but may be provided as an arbitrary ratio.

In the display apparatus 1 according to an embodiment of the present disclosure, the display panel 20 may be configured as a panel of a light-receiving/emitting display type, such as a liquid crystal display (LCD).

A cable **20*a* to transmit image data to the display panel 20, and a display driver integrated circuit (DDI) 30 (hereinafter referred to as a 'driver IC') to process digital image data to output analog image signals may be provided on one side of the display panel 20**.

The cable **20*a* may electrically connect between a control assembly 50/power assembly 60 and the driver IC 30, and also electrically connect between the driver IC 30 and the display panel 20. The cable 20*a*** may include a flexible flat cable capable of being bent, a film cable, or the like.

The driver IC 30 may receive image data and power from the control assembly 50/power assembly 60 via the cable **20*a*, and transmit image data and driving current to the display panel 20 via the cable 20*a***.

The cable **20*a* and the driver IC 30 may be implemented as a single package, such as a film cable, a chip on film (COF), and a tape carrier packet (TCP). In other words, the driver IC 30 may be disposed on the cable 20*a*. However, the present disclosure is not limited thereto, and the driver IC 30 may be disposed on the display panel 20**.

A detailed description of a structure of the display panel 20 will be described later.

The display apparatus 1 may include a backlight unit 100 configured to irradiate light toward the display panel 20. The backlight unit 100 may be provided in the main body 11. The backlight unit 100 may be disposed at the rear of the display panel 20 to radiate light toward the front where the display panel 20 is located. In detail, the backlight unit 100 may be configured as a surface light source. The display panel 20 may block or pass light emitted from the backlight unit 100.

The backlight unit 100 may include a point light source emitting monochromatic light or white light, and may be configured to refract, reflect, and scatter light in order to convert light emitted from the point light source into uniform surface light. The backlight unit 100 may emit uniform surface light toward the front by refracting, reflecting, and scattering light emitted from the point light source.

As illustrated in FIG. 2, the backlight unit 100 may include a light source module 110. The light source module 110 may generate and emit light. For example, the light source module 110 may be configured to emit monochromatic light or white light.

Figure 4:
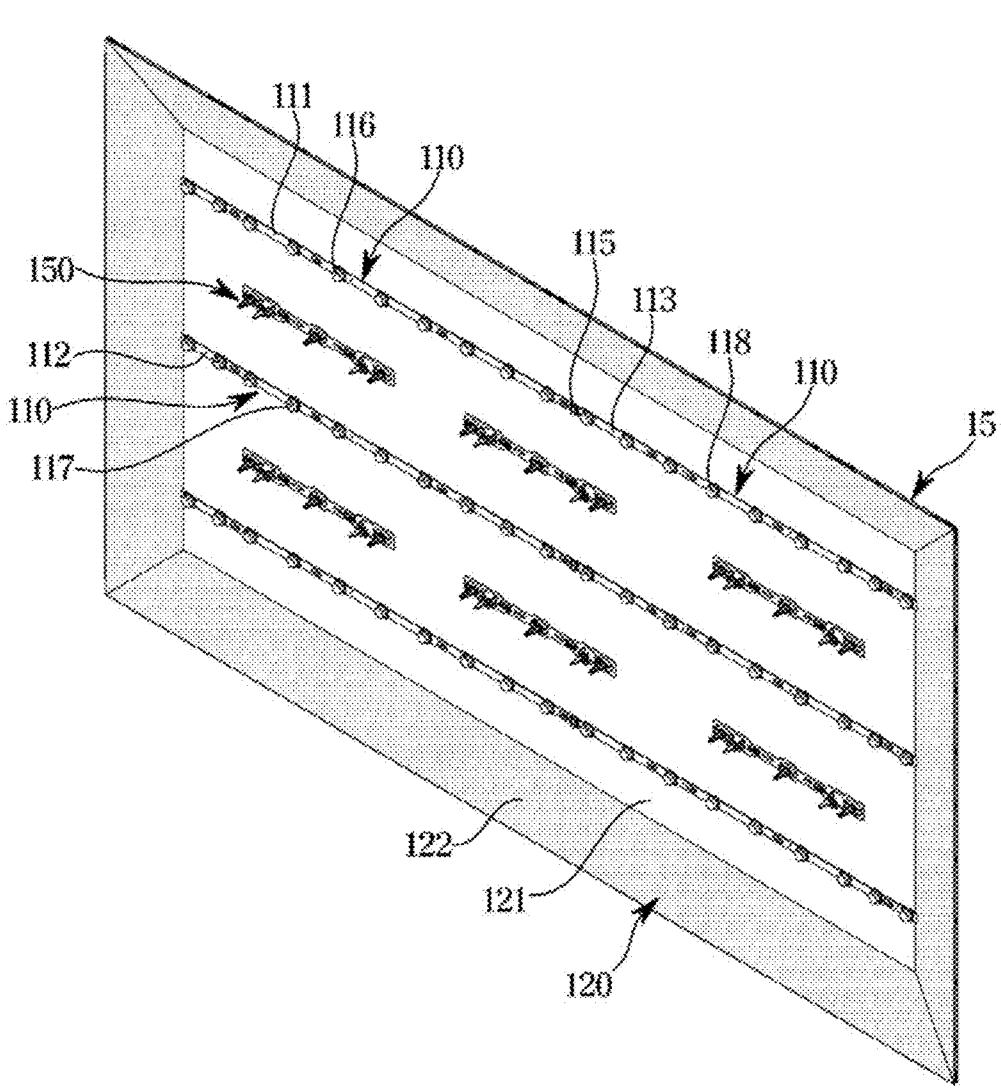
FIG. 4 illustrates the inside of the display apparatus according to an embodiment of the present disclosure.

The light source module 110 may include a plurality of light sources 116, 117, and 118 configured to irradiate light and light source substrates 111, 112, and 113 on which the plurality of light sources 116, 117, and 118 is mounted (see FIG. 4, etc.).

A detailed description of the light source module 110 will be provided later.

As illustrated in FIG. 2, the backlight unit 100 may include a reflective sheet 120 configured to reflect light. The reflective sheet 120 may reflect light forward or in a direction close to the front.

For example, the light source module 110 (e.g., the light sources 116, 117, and 118 of the light source module 110, see FIG. 4) may emit light in various directions in front of the reflective sheet 120. The light emitted from the light source module 110 may be emitted not only toward a diffuser plate 130, which will be described later, but also toward the reflective sheet 120 from the light source module 110, and the reflective sheet 120 may reflect the light emitted toward the reflective sheet 120 toward the diffuser plate 130.

According to an embodiment, while the light emitted from the light source module 110 passes through various objects such as the diffuser plate 130 and an optical sheet 140, a portion of the light may be reflected from surfaces such as the diffuser plate 130 and the optical sheet 140, and the reflective sheet 120 may reflect this light back forward.

As illustrated in FIG. 2, the backlight unit 100 may include the diffuser plate 130 configured to uniformly diffuse light. The diffuser plate 130 may be provided in front of the light source module 110 and the reflective sheet 120. The diffuser plate 130 may evenly disperse the light emitted from the light source module 110 and then emit the evenly dispersed light forward.

As illustrated in FIG. 2, the backlight unit 100 may include the optical sheet 140 configured to further improve the brightness and uniformity of brightness of emitted light. The optical sheet 140 may be configured to refract and scatter light emitted from a front surface of the diffuser plate 130. For example, the optical sheet 140 may include various types of sheets, such as a diffusion sheet, a prism sheet, a reflective polarizing sheet, and a quantum dot sheet.

The diffuser plate 130 and the optical sheet 140 may be referred to as optical members 130 and 140.

The display apparatus 1 may include the control assembly 50 configured to control operations of the backlight unit 100 and the display panel 20, and the power assembly 60 configured to supply power to the backlight unit 100 and the display panel 20. The control assembly 50 and the power assembly 60 may be provided in the main body 11.

As an example, the control assembly 50 may include a control circuit configured to control the operations of the display panel 20 and the backlight unit 100. The control circuit may process image data received from an external content source, transmit the image data to the display panel 20, and transmit dimming data to the backlight unit 100.

As an example, the power assembly 60 may supply power to the display panel 20 and the backlight unit 100 such that the backlight unit 100 outputs surface light and the display panel 20 blocks or passes light from the backlight unit 100.

The control assembly 50 and the power assembly 60 may be implemented with a printed circuit board and various circuits mounted on the printed circuit board. For example, a power circuit may include capacitors, coils, resistors, processors, etc., and a power circuit board on which these are mounted. Additionally, the control circuit may include memory, a processor, and a control circuit board on which these are mounted.

The display apparatus 1 may include a display case configured to support various components of the main body 11 of the display apparatus 1. In other words, various components of the main body 11 may be accommodated inside the display case. The display case may form the outer shape of the display apparatus 1.

As an example, the display case may support the display panel 20. As an example, the display case may support the backlight unit 100. As an example, the display case may support the control assembly 50. As an example, the display case may support the power assembly 60.

As an example, the display apparatus 1 may include a top chassis 13. The top chassis 13 may be configured to support the front surface or side surfaces of the display panel 20. As an example, the top chassis 13 may be provided in the shape of a substantially square frame.

The top chassis 13 may support the front surface of the display panel 20 by forming a bezel disposed to face the front of the display apparatus 1. However, in a case in which the display apparatus 1 is a bezel-less type display apparatus with a very narrow or no bezel, the top chassis 13 may be configured to support only the side surface of the display panel 20. In some examples, in a case in which a bottom chassis 15 supports the side surface of the display panel 20, the display apparatus 1 may not include the top chassis 13.

As an example, the display apparatus 1 may include the bottom chassis 15. The bottom chassis 15 may cover the rear of the display panel 20. The bottom chassis 15 may be coupled to the rear of the top chassis 13. The bottom chassis 15 may support various components of the display apparatus 1, such as the backlight unit 100, the control assembly 50, and the power assembly 60.

The bottom chassis 15 may be formed to have the shape of a substantially flat plate, but is not limited thereto. The bottom chassis 15 may be composed of a material with high thermal conductivity to dissipate heat generated from a light source 1100 to the outside. As an example, the bottom chassis 15 may be composed of a metal material such as aluminum or SUS, or a plastic material such as ABS.

As an example, the display apparatus 1 may include a middle mold 14. The middle mold 14 may be disposed between the top chassis 13 and the bottom chassis 15. For example, the middle mold 14 may support at least some components of the backlight unit 100.

As an example, the display apparatus 1 may include a rear cover 16. The rear cover 16 may be disposed at the rear of the bottom chassis 15 and may cover the bottom chassis 15 and various components mounted on the rear of the bottom chassis 15 (for example, the control assembly 50, the power assembly 60, etc.).

In some examples, the display case of the display apparatus 1 according to the present disclosure may not include some of the top chassis, the middle mold, the bottom chassis, and the rear cover.

The configuration of the display apparatus 1 described above with reference to FIG. 2 is only an example for explaining the display apparatus according to the present disclosure, and the present disclosure is not limited thereto. The display apparatus according to the present disclosure may be configured to include various configurations for performing a function of providing images through a screen.

Figure 3:
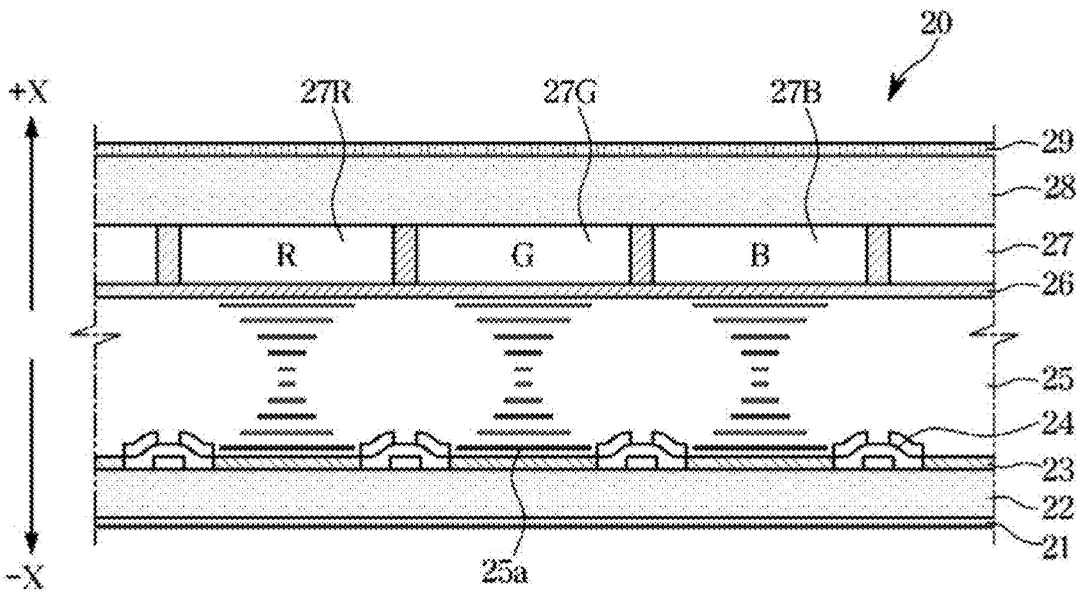
FIG. 3 is an enlarged cross-sectional view illustrating a configuration of a portion of a display module of the display apparatus according to an embodiment of the present disclosure.

FIG. 3 is an enlarged view of a portion of a cross-section of the display panel of the display apparatus according to an embodiment of the present disclosure.

Referring to FIG. 3, the display panel 20 included in the display apparatus 1 according to an embodiment of the present disclosure may be configured as a liquid crystal display (LCD) panel to block or pass light emitted from the backlight unit 100. The image I may be formed in front of the display panel 20 by the operation of the display panel 20 blocking or passing light emitted from the backlight unit 100.

The front surface of the display panel 20 may form the screen 12 of the display apparatus 1 described above. The plurality of pixels P may be provided on the display panel 20. The plurality of pixels P provided on the display panel 20 may each independently block or pass light from the backlight unit 100, and the light passed by the plurality of pixels P may form the image I displayed on the screen 12.

For example, as illustrated in FIG. 3, the display panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fix and support the pixel electrode 23, the thin film transistor 24, the liquid crystal layer 25, the common electrode 26, and the color filter 27. These first and second transparent substrates 22 and 28 may be composed of reinforced glass or transparent resin.

The first polarizing film 21 and the second polarizing film 29 may be provided on outer sides of the first and second transparent substrates 22 and 28.

The first polarizing film 21 and the second polarizing film 29 may each pass specific light and block other light. For example, the first polarizing film 21 may pass light having a magnetic field oscillating in a first direction and block other light. Also, the second polarizing film 29 may pass light having a magnetic field oscillating in a second direction and block other light. In this case, the first direction and the second direction may be orthogonal to each other. Accordingly, a polarization direction of the light passed through the first polarizing film 21 and an oscillation direction of the light passed through the second polarizing film 29 may be orthogonal to each other. As a result, generally, light may not pass through the first polarizing film 21 and the second polarizing film 29 simultaneously.

The color filter 27 may be provided on an inner side of the second transparent substrate 28.

The color filter 27 may include, for example, a red filter 27R to pass red light, a green filter 27G to pass green light, and a blue filter 27B to pass blue light, and the red filter 27R, the green filter 27G, and the blue filter 27B may be arranged side by side with each other. A region in which the color filter 27 is formed may correspond to the pixel P described above. A region in which the red filter 27R is formed may correspond to the red subpixel PR, a region in which the green filter 27G is formed may correspond to the green subpixel PG, and a region in which the blue filter 27B is formed may correspond to the blue subpixel PB.

The pixel electrode 23 may be provided on an inner side of the first transparent substrate 22, and the common electrode 26 may be provided on the inner side of the second transparent substrate 28.

The pixel electrode 23 and the common electrode 26 may be composed of a metal material conducting electricity, and may generate an electric field for changing the arrangement of a liquid crystal molecules 25*a* constituting the liquid crystal layer 25, which will be described later.

The pixel electrode 23 and the common electrode 26 may be composed of a transparent material and may pass light incident from the outside. For example, the pixel electrode 23 and the common electrode 26 may be composed of indium tin oxide (ITO), indium zinc oxide (IZO), silver nanowire, carbon nanotube (CNT), graphene, or 3,4-ethylenedioxythiophene (PEDOT). The thin film transistor (TFT) 24 may be provided on the inner side of the first transparent substrate 22.

The thin film transistor 24 may pass or block the current flowing to the pixel electrode 23. For example, an electric field may be generated or removed between the pixel electrode 23 and the common electrode 26 depending on whether the thin film transistor 24 is turned on (closed) or turned off (opened).

The thin film transistor 24 may be composed of polysilicon, and may be formed through a semiconductor process such as lithography, deposition, or ion implantation process.

The liquid crystal layer 25 may be formed between the pixel electrode 23 and the common electrode 26. The liquid crystal layer 25 may be filled by the liquid crystal molecules 25*a*.

Liquid crystals represent an intermediate state between a solid (crystal) and a liquid. Most of liquid crystal materials are organic compounds, a molecular shape thereof is in the shape of a long and thin rod, and the arrangement of molecules thereof may appear irregular in some directions, but may take the form of regular crystals in other directions. As a result, liquid crystals may have both the fluidity of a liquid and the optical anisotropy of a crystal (solid).

Also, liquid crystals may exhibit optical properties depending on changes in the electric field. For example, liquid crystals may change a direction of the molecular arrangement making up the liquid crystals depending on change in the electric field. When an electric field is generated in the liquid crystal layer 25, the liquid crystal molecules 25*a* of the liquid crystal layer 25 may be arranged according to the direction of the electric field, and when an electric field is not generated in the liquid crystal layer 25, the liquid crystal molecules 25*a* may be arranged irregularly or arranged along an alignment layer. As a result, the optical properties of the liquid crystal layer 25 may vary depending on the presence or absence of an electric field passing through the liquid crystal layer 25.

The structure of the display panel 20 described above with reference to FIG. 3 is only an example of a structure that a display panel of a display apparatus according to the present disclosure may have, and the present disclosure is not limited thereto.

Figure 5:
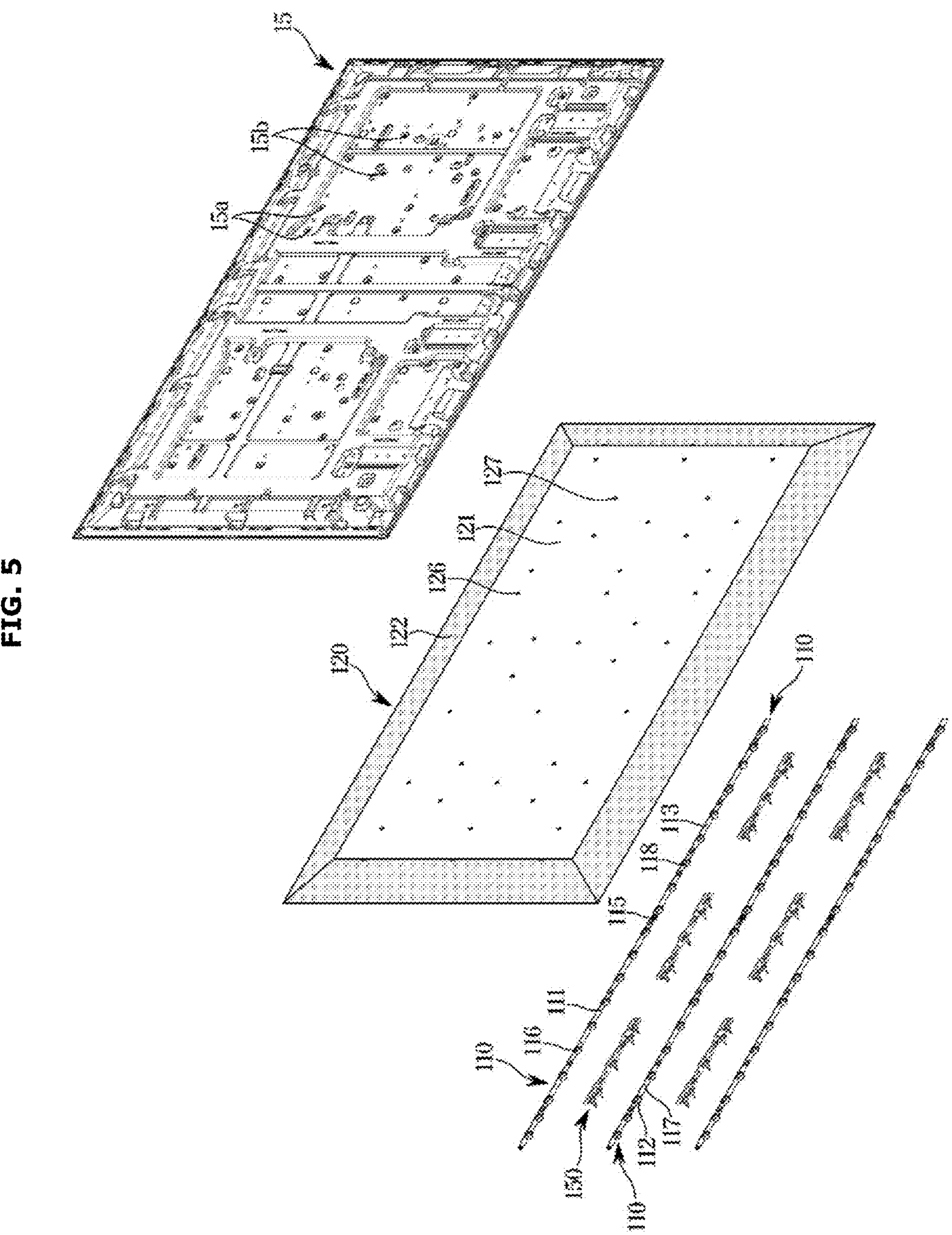
FIG. 5 is an exploded view illustrating a configuration of a part of the display apparatus according to an embodiment of the present disclosure.
Figure 6:
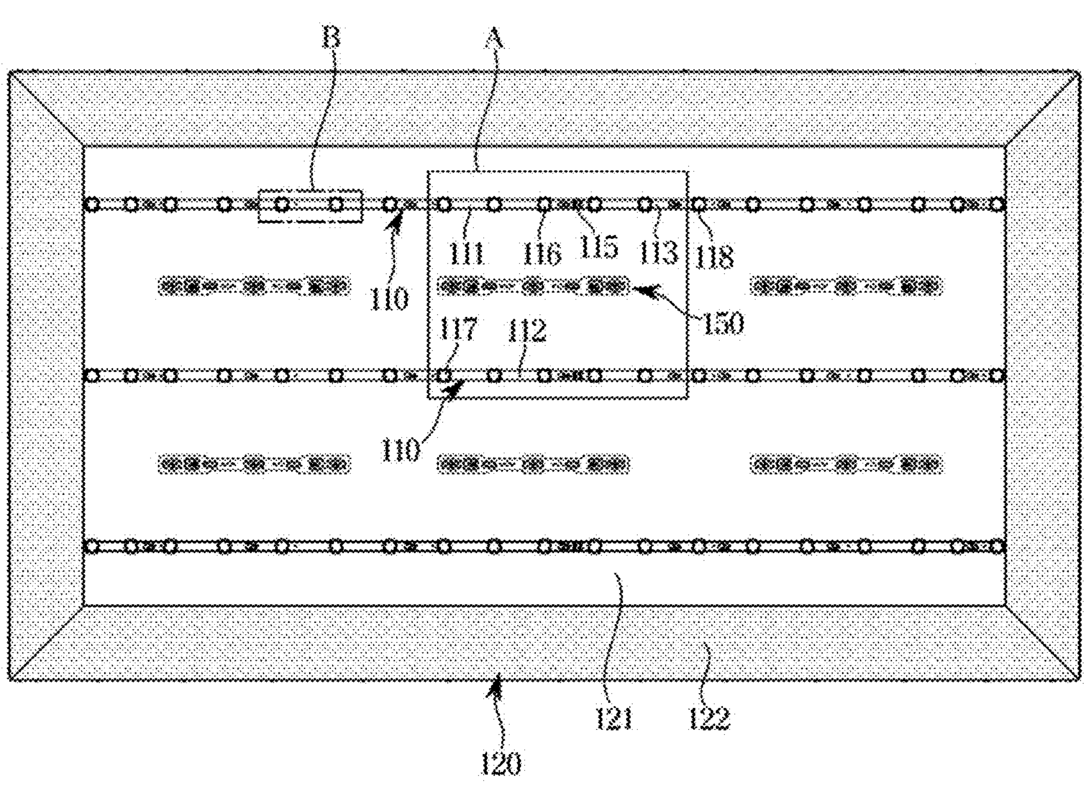
FIG. 6 is a front view of the part of the display apparatus according to an embodiment of the present disclosure.
Figure 7:
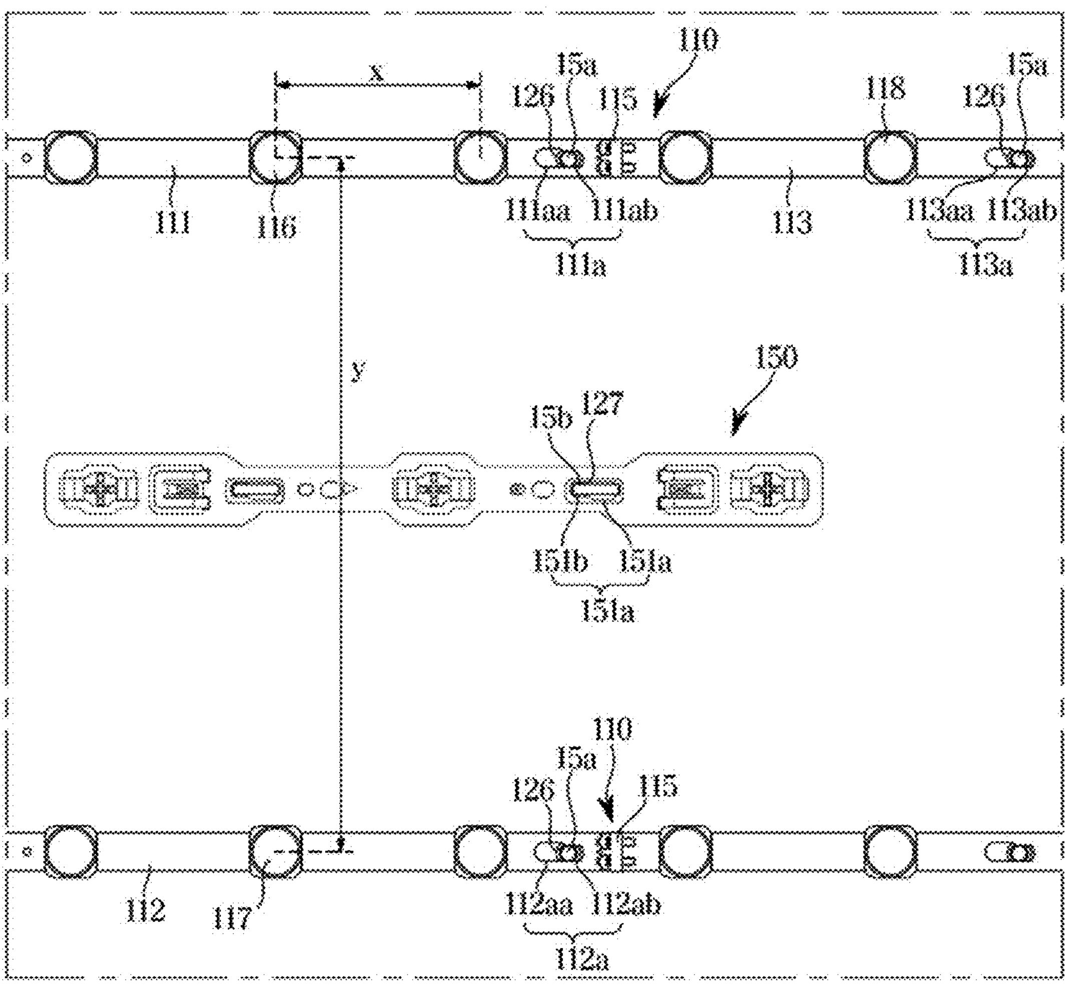
FIG. 7 is an enlarged view of a portion A shown in FIG. 6 according to an embodiment of the present disclosure.
Figure 8:
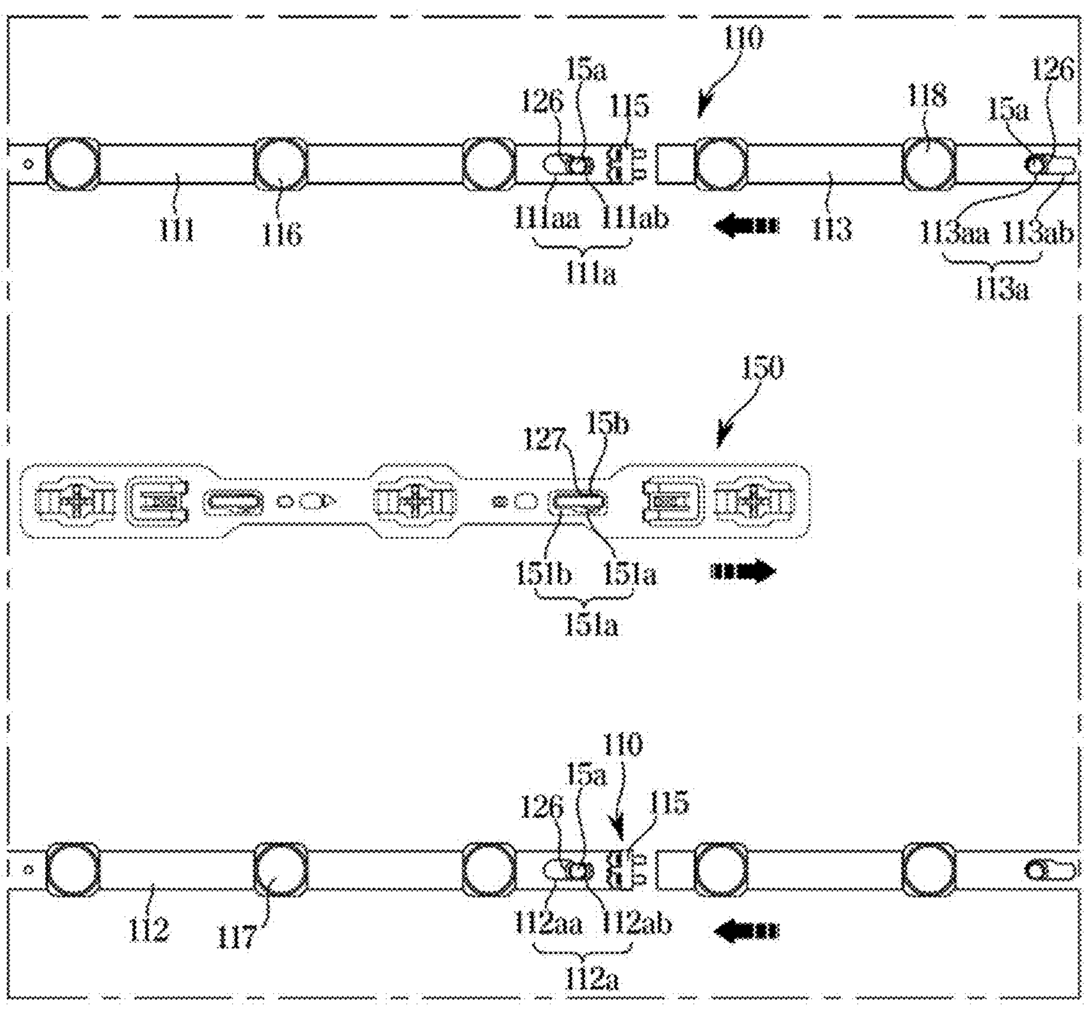
FIG. 8 illustrates a state in which a third light source substrate in FIG. 7 is separated from a connector according to an embodiment of the present disclosure.

FIG. 4 illustrates the inside of the display apparatus according to an embodiment of the present disclosure. FIG. 5 is an exploded view illustrating a configuration of a part of the display apparatus according to an embodiment of the present disclosure. FIG. 6 is a front view of the part of the display apparatus according to an embodiment of the present disclosure. FIG. 7 is an enlarged view of a portion A shown in FIG. 6. FIG. 8 illustrates a state in which a third light source substrate in FIG. 7 is separated from a connector.

Referring to FIGS. 4 and 5, the display apparatus 1 according to an embodiment of the present disclosure may include the reflective sheet 120 and the light source module 110 disposed on the reflective sheet 120. As an example, the light source module 110 may be positioned in front of the reflective sheet 120.

The display apparatus 1 according to an embodiment of the present disclosure may be configured such that the reflective sheet 120 is disposed in front of the bottom chassis 15 and the light source module 110 is disposed in front of the reflective sheet 120.

The light source module 110 of the display apparatus 1 according to an embodiment of the present disclosure may include the light source substrates 111, 112, and 113 arranged in front of the reflective sheet 120. The light source substrates 111, 112, and 113 of the light source module 110 may be positioned in front of the reflective sheet 120.

As an example, the light source module 110 may include the first light source substrate 111 and the second light source substrate 112 positioned below the first light source substrate 111. The second light source substrate 112 may be arranged parallel to the first light source substrate 111. The first light source substrate 111 and the second light source substrate 112 may be arranged in an up-down direction. The second light source substrate 112 may be disposed to be spaced apart from the first light source substrate 111.

As an example, the light source module 110 may include the third light source substrate 113 connected to the first light source substrate 111. The third light source substrate 113 may be electrically connected to the first light source substrate 111. The first light source substrate 111 and the third light source substrate 113 may be arranged in a left-right direction.

The display apparatus 1 according to an embodiment of the present disclosure may further include additional light source substrates, without being limited to the first light source substrate 111, the second light source substrate 112, and the third light source substrate 113.

The light source module 110 of the display apparatus 1 according to an embodiment of the present disclosure may include a plurality of the first light sources 116 mounted on the first light source substrate 111. As an example, the first light source substrate 111 may have a bar shape extending in the left-right direction, and the plurality of first light sources 116 may be arranged in the left-right direction on the first light source substrate 111. The plurality of first light sources 116 may be spaced apart from each other on the first light source substrate 111.

The light source module 110 of the display apparatus 1 according to an embodiment of the present disclosure may include a plurality of the second light sources 117 mounted on the second light source substrate 112. As an example, the second light source substrate 112 may have a bar shape extending in the left-right direction, and the plurality of second light sources 117 may be arranged in the left-right direction on the second light source substrate 112. The plurality of second light sources 117 may be spaced apart from each other on the second light source substrate 112.

The light source module 110 of the display apparatus 1 according to an embodiment of the present disclosure may include a plurality of the third light sources 118 mounted on the third light source substrate 113. As an example, the third light source substrate 113 may have a bar shape extending in the left-right direction, and the plurality of third light sources 118 may be arranged in the left-right direction on the third light source substrate 113. The plurality of third light sources 118 may be spaced apart from each other on the third light source substrate 113.

The display apparatus 1 according to an embodiment of the present disclosure may further include additional light sources, without being limited to the plurality of first light sources 116, the plurality of second light sources 117, and the plurality of third light sources 118.

The reflective sheet 120 of the display apparatus 1 according to an embodiment of the present disclosure may be positioned at the rear of the light source module 110. The reflective sheet 120 may include a seating portion 121 on which the light source module 110 is seated, and an edge portion 122 provided along an edge of the seating portion 121.

The edge portion 122 may be formed to be inclined with respect to the seating portion 121. For example, the edge portion 122 may be inclined with respect to the seating portion 121 so that the reflective sheet 120 may correspond to the shape of the bottom chassis 15. The reflective sheet 120 may be formed concavely to correspond to the shape of the bottom chassis 15 as a front surface of the bottom chassis 15 is formed concavely to accommodate the light source module 110. Accordingly, the edge portion 122 may be inclined with respect to the seating portion 121 to form a concave shape together with the seating portion 121.

The edge portion 122 of the reflective sheet 120 may be formed to reduce brightness. Because the brightness at the edge portion 122 may be higher than the brightness at the seating portion 121 as the reflective sheet 120 has a concave shape, the display apparatus 1 according to an embodiment of the present disclosure may have a configuration for reducing brightness in the edge portion 122 in order to uniform brightness. For example, the display apparatus 1 may be configured to reduce brightness by applying black ink to the edge portion 122.

The display apparatus 1 according to an embodiment of the present disclosure may include a supporter 150 configured to maintain a distance between the plurality of light sources 116, 117, and 118 of the light source module 110 and the optical members 130 and 140. The supporter 150 may be disposed on the reflective sheet 120. The supporter 150 may be disposed between the reflective sheet 120 and the optical members 130 and 140. The supporter 150 may support components disposed in front of the light source module 110. As an example, the supporter 150 may support the diffuser plate 130 and/or the optical sheet 140. The supporter 150 may extend from the reflective sheet 120. For example, the supporter 150 may extend between the reflective sheet 120 and the diffuser plate 130.

The supporter 150 may be configured to maintain optical characteristics of the display apparatus 1 by maintaining an optical distance (OD) between the plurality of light sources 116, 117, and 118 of the light source module 110 and the optical members 130 and 140. For example, the supporter 150 may be configured to have a length capable of maintaining optical characteristics of the backlight unit 100.

Referring to FIGS. 6 to 8, the display apparatus 1 according to an embodiment of the present disclosure may be configured such that a first distance y between any one of the plurality of first light sources 116 mounted on the first light source substrate 111 and any one of the plurality of second light sources 117 mounted on the second light source substrate 112 is different from a second distance x between the plurality of first light sources 116 mounted on the first light source substrate 111. For example, the first distance y may include the closest distance among distances between one of the plurality of first light sources 116 mounted on the first light source substrate 111 and one of the plurality of second light sources 117 mounted on the second light source substrate 112.

The display apparatus 1 according to an embodiment of the present disclosure may be configured such that the first distance y is greater than or equal to two times the second distance x and less than or equal to four times the second distance x. For example, in a case in which the first distance y is set to be less than two times the second distance x, the reflectance of the reflective sheet 120 may be higher than the reflectance of the light source substrates 111, 112, and 113, so that the light source substrates 111, 112, and 113 may be viewed on the screen 12. For example, in a case in which the first distance y is set to be greater than four times the second distance x, there may be insufficient light to drive the display apparatus 1.

Because the display apparatus 1 according to an embodiment of the present disclosure is configured such that the first distance y is greater than or equal to two times the second distance x and less than or equal to four times the second distance x, more light may be provided to the light source substrates 111, 112, and 113, and therefore, the uniformity of an image displayed on the screen 12 may be improved even though the reflectance of the light source substrates 111, 112, and 113 is lower than the reflectance of the reflective sheet 120.

The display apparatus 1 according to an embodiment of the present disclosure may include a substrate connector 115 to connect the first light source substrate 111 and the third light source substrate 113. For example, the first light source substrate 111 may be connected to one side of the substrate connector 115, and the third light source substrate 113 may be connected to the opposite side of the one side of the substrate connector 115. As an example, the opposite side of one side of the first light source substrate 111 connected to the substrate connector 115 may be electrically connected to the control assembly 50 and/or the power assembly 60, and the third light source substrate 113 may be electrically connected to the control assembly 50 and/or the power assembly 60 by being connected to the first light source substrate 111 through the substrate connector 115.

Referring to FIGS. 5, 7, and 8, the light source module 110 of the display apparatus 1 according to an embodiment of the present disclosure may be mounted on the bottom chassis 15. The light source substrates 111, 112, and 113 of the light source module 110 may be detachably mounted on the bottom chassis 15.

The bottom chassis 15 may include a module mounting protrusion **15*a* for mounting the light source module 110. The module mounting protrusion 15*a* may protrude forward from the front surface of the bottom chassis 15**.

The reflective sheet 120 of the display apparatus 1 according to an embodiment of the present disclosure may be accommodated in the bottom chassis 15. The reflective sheet 120 may include a first opening 126 formed to allow the module mounting protrusion 15*a* of the bottom chassis 15 to pass through. As an example, the first opening 126 may have a hole shape. When the reflective sheet 120 is mounted on the bottom chassis 15, the module mounting protrusion 15*a* may pass through the first opening 126 and protrude further forward than the reflective sheet 120. The first opening 126 may be formed to allow the module mounting protrusion 15*a* to pass through in order to be coupled to the light source substrates 111, 112, and 113.

The light source module 110 may be mounted on the bottom chassis 15 in a state in which the reflective sheet 120 is mounted on the bottom chassis 15. For example, in order to mount the first light source substrate 111 to the bottom chassis 15, the first light source substrate 111 may include a first substrate mounting part 111*a*. The first substrate mounting part 111*a* may include a first passing portion 111*aa* through which the module mounting protrusion 15*a* is passable, and a first restricting portion 111*ab* capable of restricting the forward/rearward movement of the module mounting protrusion 15*a*. As the module mounting protrusion 15*a* passes through the first passing portion 111*aa* and then moves to the first restricting portion 111*ab*, the first light source substrate 111 may be mounted on the bottom chassis 15. As the module mounting protrusion 15*a* is inserted into the first passing portion 111*aa* and then moves slidingly to the first restricting portion 111*ab*, the first light source substrate 111 may be mounted on the bottom chassis 15.

For example, in order to mount the second light source substrate 112 to the bottom chassis 15, the second light source substrate 112 may include a second substrate mounting part 112*a*. The second substrate mounting part 112*a* may include a second passing portion 112*aa* through which the module mounting protrusion 15*a* is passable, and a second restricting portion 112*ab* capable of restricting the forward/rearward movement of the module mounting protrusion 15*a*. As the module mounting protrusion 15*a* passes through the second passing portion 112*aa* and then moves to the second restricting portion 112*ab*, the second light source substrate 112 may be mounted on the bottom chassis 15. As the module mounting protrusion 15*a* is inserted into the second passing portion 112*aa* and then moves slidingly to the second restricting portion 112*ab*, the second light source substrate 112 may be mounted on the bottom chassis 15.

For example, in order to mount the third light source substrate 113 to the bottom chassis 15, the third light source substrate 113 may include a third substrate mounting part 113*a*. The third substrate mounting part 113*a* may include a third passing portion 113*aa* through which the module mounting protrusion 15*a* is passable, and a third restricting portion 113*ab* capable of restricting the forward/rearward movement of the module mounting protrusion 15*a*. As the module mounting protrusion 15*a* passes through the third passing portion 113*aa* and then moves to the third restricting portion 113*ab*, the third light source substrate 113 may be mounted on the bottom chassis 15. As the module mounting protrusion 15*a* is inserted into the third passing portion 113*aa* and then moves slidingly to the third restricting portion 113*ab*, the third light source substrate 113 may be mounted on the bottom chassis 15.

Referring to FIGS. 7 and 8, for example, the third light source substrate 113 may be mounted on the bottom chassis 15 in the state in which the reflective sheet 120 is mounted on the bottom chassis 15. As illustrated in FIG. 8, the third light source substrate 113 is positioned such that the module mounting protrusion 15*a* of the bottom chassis 15 passes through the third passing portion 113*aa*. In a state in which the module mounting protrusion 15*a* is positioned to pass through the third passing portion 113*aa*, the third light source substrate 113 may move such that the module mounting protrusion 15*a* is positioned in the third restricting portion 113*ab*. As an example, the third light source substrate 113 may move in a direction of being connected to the substrate connector 115 in the state in which the module mounting protrusion 15*a* is positioned to pass through the third passing portion 113*aa*.

Referring to FIG. 7, the third light source substrate 113 may be mounted on the bottom chassis 15 and also connected to the substrate connector 115 as the module mounting protrusion 15*a* is positioned on the third restricting portion 113*ab*.

Referring to FIG. 5, the bottom chassis 15 may include a supporter mounting portion 15*b* so that the supporter 150 may be mounted on the bottom chassis 15. The supporter mounting portion 15*b* may protrude forward from the front surface of the bottom chassis 15.

Referring to FIG. 5, the reflective sheet 120 may include a second opening 127 formed to allow the supporter mounting portion 15*b* of the bottom chassis 15 to pass through. For example, the second opening 127 may have a hole shape. When the reflective sheet 120 is mounted on the bottom chassis 15, the supporter mounting portion 15*b* may protrude further forward than the reflective sheet 120 by passing through the second opening 127.

In the state in which the reflective sheet 120 is mounted on the bottom chassis 15, the supporter 150 may be mounted on the bottom chassis 15. For example, in order to mount the supporter 150 to the bottom chassis 15, the supporter 150 may include a supporter coupling part 151. The supporter coupling part 151 may include a supporter passing portion 151*a* through which the supporter mounting portion 15*b* is passable and a supporter restricting portion 151*b* capable of restricting movement of the supporter mounting portion 15*b* in a front-rear direction. As the supporter mounting portion 15*b* passes the supporter passing portion 151*a* and then moves to the supporter restricting portion 151*b*, the supporter 150 may be mounted on the bottom chassis 15.

In the display apparatus 1 according to an embodiment of the present disclosure, because the light source module 110 and the reflective sheet 120 may be mounted on the bottom chassis 15 as the reflective sheet 120 is mounted on the bottom chassis 15 and then the light source module 110 is mounted on the bottom chassis 15, compared to a structure in which the light source module 110 is disposed at the rear of the reflective sheet 120, that is, a method in which the light source module 110 is mounted on the bottom chassis 15, the reflective sheet 120 is mounted on the bottom chassis 15, and then the reflective sheet 120 is fixed to the light source module 110, ease of assembly may be improved.

Figure 9:
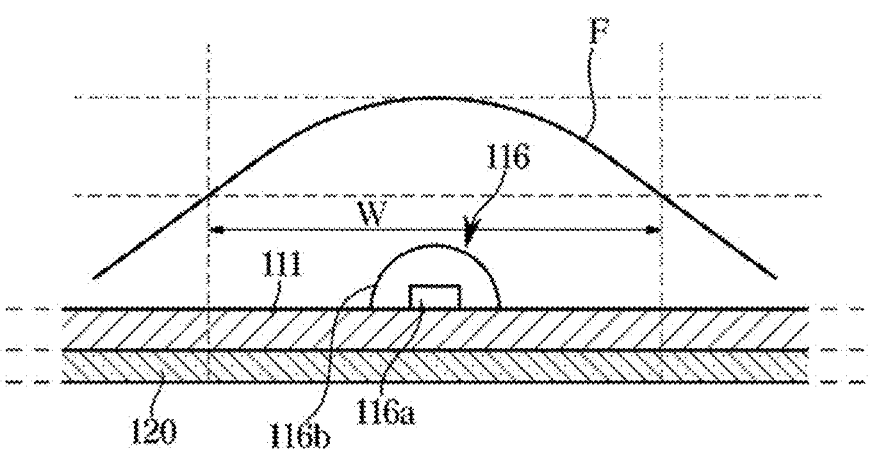
FIG. 9 schematically illustrates an optical profile of one light source among a plurality of light sources of a light source module of the display apparatus according to an embodiment of the present disclosure.

FIG. 9 schematically illustrates an optical profile of one light source among a plurality of light sources of a light source module of the display apparatus according to an embodiment of the present disclosure.

Hereinafter, for convenience of explanation, one of the plurality of first light sources 116 mounted on the first light source substrate 111 will be described, and the configuration of the one first light source 116 may be applied equally to the plurality of first light sources 116, and may also be applied to the plurality of second light sources 117 and/or the plurality of third light sources 118.

Referring to FIG. 9, the first light source substrate 111 may be disposed in front of the reflective sheet 120, and the first light source 116 mounted on the first light source substrate 111 may include a light emitting diode 116*a* and a light source lens 116*b* configured to cover the light emitting diode 116*a* in order to protect the light emitting diode 116*a*.

The first light source 116 disposed on the first light source substrate 111 may be set such that a width of a region having half the brightness compared to a brightest portion (front of the light-emitting diode 116*a*) in a light profile F is a maximum half-width W.

The display apparatus 1 according to an embodiment of the present disclosure may be configured such that the maximum half-width W of the first light source 116 is greater than the first distance y. For example, the maximum half-width W of the first light source 116 may be set to be greater than or equal to the first distance y and less than or equal to 1.15 times the first distance y between any one of the plurality of first light sources 116 mounted on the first light source substrate 111 and any one of the plurality of second light sources 117 mounted on the second light source substrate 112.

As the display apparatus 1 according to an embodiment of the present disclosure is designed such that the maximum half-width W of each of the plurality of light sources 116, 117, and 118 mounted on the light source substrates 111, 112, and 113 is greater than or equal to the first distance y and less than or equal to 1.15 times the first distance y between any one of the plurality of first light sources 116 mounted on the first light source substrate 111 and any one of the plurality of second light sources 117 mounted on the second light source substrate 112, more light may be provided to the light source substrates 111, 112, and 113, and therefore the brightness may be improved.

Figure 10:
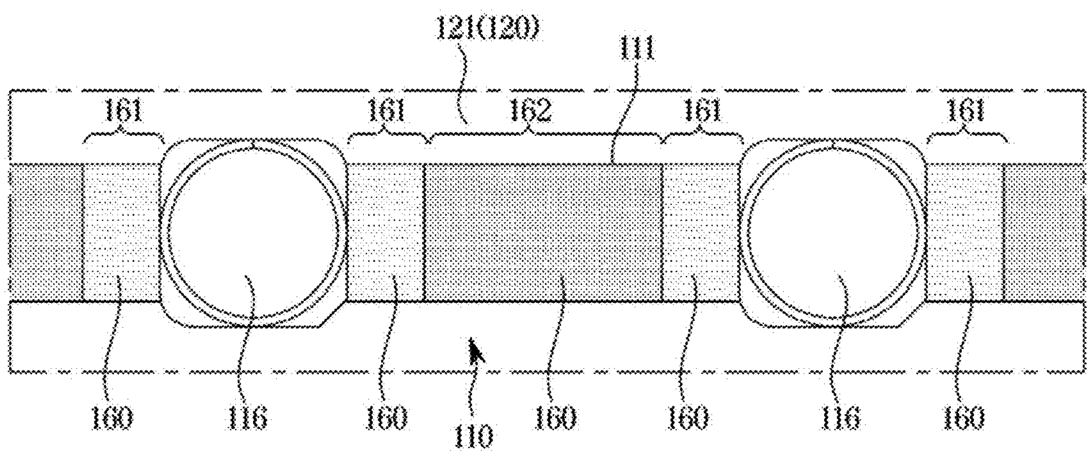
FIG. 10 is an enlarged view of a portion B shown in FIG. 6 according to an embodiment of the present disclosure.

FIG. 10 is an enlarged view of a portion B shown in FIG. 6.

Hereinafter, for convenience of explanation, the first light source substrate 111 and some of the plurality of first light sources 116 will be described, and the configuration of some of the first light source substrate 111 and the plurality of first light sources 116 may also be applied to the second light source substrate 112 and the plurality of second light sources 117, and may also be applied to the third light source substrate 113 and the plurality of third light sources 118.

Referring to FIG. 10, the display apparatus 1 according to an embodiment of the present disclosure may further include a reflector 160 to improve the reflectance of the first light source substrate 111 of the light source module 110. As an example, the reflector 160 may include white ink. For example, the reflector 160 may include a photo solder resist (PSR). By the reflector 160, a difference in reflectance between the first light source substrate 111 and the reflective sheet 120 may be improved.

The reflector 160 of the display apparatus 1 according to an embodiment of the present disclosure may be provided in different amounts depending on predetermined regions on the first light source substrate 111. For example, the reflector 160 of a relatively small amount may be applied to a first region 161 adjacent to each of the plurality of first light sources 116, and the reflector 160 of a relatively large amount may be applied to second regions 162 spaced apart from the plurality of first light sources 116. The second regions 162 may be provided between the plurality of first light sources 116.

As an example, the reflector 160 may be applied to the first light source substrate 111. For example, because the second regions 162 are spaced apart from the plurality of first light sources 116, the second regions 162 may be relatively light-deprived compared to the first regions 161. Therefore, the reflectance of light in the second regions 162 is improved more than the reflectance of light in the first regions 161, so that uniformity of overall brightness of the display apparatus 1 may be improved.

A display apparatus according to an embodiment includes a reflective sheet, a light source substrate on the reflective sheet and including a first light source substrate and a second light source substrate, and a plurality of light sources including a plurality of first light sources on the first light source substrate and a plurality of second light sources on the second light source substrate. A first distance between a first light source of the plurality of first light sources and a second light source of the plurality of second light sources is greater than or equal to two times a second distance and less than or equal to four times the second distance. The second distance is a distance between adjacent first light sources of the plurality of first light sources.

The first distance may be a smallest distance among distances between one of the plurality of first light sources and one of the plurality of second light sources.

The first light source substrate and the second light source substrate may be separated in an up-down direction.

The display apparatus may further include a bottom chassis configured to accommodate the reflective sheet. The light source substrate may be configured to be mounted on the bottom chassis in a state in which the reflective sheet is mounted on the bottom chassis.

The bottom chassis may include a module mounting protrusion. The light source substrate may include a passing portion into which the module mounting protrusion is configured to be inserted, and a restricting portion configured to restrict detachment of the module mounting protrusion in a state in which the module mounting protrusion is inserted therein.

In a state in which the module mounting protrusion is inserted into the passing portion, the light source substrate may be configured to be mounted on the bottom chassis as the module mounting protrusion inserts into the restricting portion.

The reflective sheet may include an opening through which the module mounting protrusion is inserted to be coupled with the light source substrate.

The display apparatus may further include a display panel, an optical member and between the display panel and the reflective sheet, and a supporter on the reflective sheet and configured to support the optical member.

A reflectance of the light source substrate may be less than a reflectance of the reflective sheet.

A width of a region around a light source of the plurality of light sources may be based on a distance from a brightest portion of the light source to a point at which a brightness is half of a brightness of the brightest portion. The width may be greater than or equal to the first distance and less than or equal to 1.15 times the first distance.

The display apparatus may further include a reflector disposed on the light source substrate and provided in a greater amount in second regions spaced apart from the plurality of light sources than in first regions adjacent to the plurality of light sources.

The reflector may include a photo solder resist (PSR) on the light source substrate.

At least a portion of an edge of the reflective sheet may have a reduced reflectivity compared to another portion of the reflective sheet.

A distance between the plurality of second light sources may be equal to a distance between the plurality of first light sources.

The display apparatus may further include a third light source substrate arranged in a left-right direction with the first light source substrate, and a substrate connector configured to electrically connect the first light source substrate and the third light source substrate.

A display apparatus according to an embodiment includes a bottom chassis, a reflective sheet disposed in front of the bottom chassis, a first light source substrate disposed in front of the reflective sheet, a second light source substrate disposed in front of the reflective sheet and arranged in an up-down direction with the first light source substrate, a plurality of first light sources mounted on the first light source substrate, and a plurality of second light sources mounted on the second light source substrate. A closest first distance among distances between one of the plurality of first light sources and one of the plurality of second light sources is set to be greater than or equal to two times the second distance x and less than or equal to four times a second distance x between the plurality of first light sources.

The first light source substrate and the second light source substrate may be detachably mounted on the bottom chassis when the reflective sheet is mounted on the bottom chassis.

At least one of the plurality of first light sources or the plurality of second light sources may be configured such that a width W of a region having half the brightness compared to a brightest portion is greater than or equal to the first distance and less than or equal to 1.15 times the first distance.

The display apparatus may further include a reflector to be applied to at least one of the first light source substrate and the second light source substrate, and the reflector is provided to be applied in a larger amount in second regions spaced apart from the plurality of first light sources or the plurality of second light sources than in first regions adjacent to the plurality of first light sources or the plurality of second light sources.

A reflectance of at least one of the first light source substrate and the second light source substrate may be set to be lower than a reflectance of the reflective sheet.

According to an embodiment of the present disclosure, ease of assembly of a display apparatus can be improved because a light source module is disposed in front of a reflective sheet.

According to an embodiment of the present disclosure, the display apparatus may be configured such that distances between the plurality of light sources is set so that more light can be provided to a light source substrate than to the reflective sheet, so that the brightness can be improved.

According to an embodiment of the present disclosure, the display apparatus may be configured to use a smaller number of light source substrates compared to a case in which distances between a plurality of light sources mounted on a single substrate is the same as distances between light sources mounted on different substrates, so that material costs can be reduced.

Effects obtainable from the present disclosure are not limited to the effects mentioned above, and other effects not mentioned will be clearly understood by those skilled in the art to which the present disclosure belongs from the fallowing description.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

What is claimed is:

1. A display apparatus comprising:
- a reflective sheet;
- a light source substrate on the reflective sheet and comprising a first light source substrate and a second light source substrate; and
- a plurality of light sources comprising a plurality of first light sources on the first light source substrate, and a plurality of second light sources on the second light source substrate,
- wherein a first distance between a first light source of the plurality of first light sources and a second light source of the plurality of second light sources is greater than or equal to two times a second distance and less than or equal to four times the second distance, and
- wherein the second distance is a distance between adjacent first light sources of the plurality of first light sources,
- wherein a width of a region around a light source of the plurality of light sources is based on a distance from a brightest portion of the light source to a point at which a brightness is half of a brightness of the brightest portion, and
- wherein the width is greater than or equal to the first distance and less than or equal to 1.15 times the first distance.

2. The display apparatus according to claim 1, wherein the first distance is a smallest distance among distances between one of the plurality of first light sources and one of the plurality of second light sources.

3. The display apparatus according to claim 1, wherein the first light source substrate and the second light source substrate are separated in an up-down direction.

4. The display apparatus according to claim 1, further comprising:
- a bottom chassis configured to accommodate the reflective sheet,
- wherein the light source substrate is configured to be mounted on the bottom chassis in a state in which the reflective sheet is mounted on the bottom chassis.

5. The display apparatus according to claim 4, wherein the bottom chassis comprises a module mounting protrusion, and
- wherein the light source substrate comprises:
  - a passing portion into which the module mounting protrusion is configured to be inserted; and
  - a restricting portion configured to restrict detachment of the module mounting protrusion in a state in which the module mounting protrusion is inserted therein.

6. The display apparatus according to claim 5, wherein, in a state in which the module mounting protrusion is inserted into the passing portion, the light source substrate is configured to be mounted on the bottom chassis as the module mounting protrusion inserts into the restricting portion.

7. The display apparatus according to claim 5, wherein the reflective sheet comprises an opening through which the module mounting protrusion is inserted to be coupled with the light source substrate.

8. The display apparatus according to claim 1, further comprising:
- a display panel;
- an optical member between the display panel and the reflective sheet; and a supporter on the reflective sheet and configured to support the optical member.

9. The display apparatus according to claim 1, wherein a reflectance of the light source substrate is less than a reflectance of the reflective sheet.

10. The display apparatus according to claim 1, further comprising:

reflective portions on the light source substrate, the reflective portions provided in second regions spaced apart from the plurality of light sources to cover more area, than in first regions adjacent to the plurality of light sources.

11. The display apparatus according to claim 10, wherein the reflective portions comprise a photo solder resist (PSR) on the light source substrate.

12. The display apparatus according to claim 1, wherein at least a portion of an edge of the reflective sheet has a reduced reflectivity compared to another portion of the reflective sheet.

13. The display apparatus according to claim 1, wherein a distance between the plurality of second light sources is equal to a distance between the plurality of first light sources.

14. The display apparatus according to claim 1, further comprising:

a third light source substrate arranged in a left-right direction with the first light source substrate; and a substrate connector configured to electrically connect the first light source substrate and the third light source substrate.

15. A display apparatus comprising:

a reflective sheet;

a light source substrate on the reflective sheet and comprising a first light source substrate, and a second light source substrate separated from the first light source substrate by a first distance in a first direction; and a plurality of light sources provided on the light source substrate along a second direction that is different from the first direction, wherein a second distance is a distance in the second direction between adjacent light sources of the plurality of light sources, and wherein the first distance is at least two times the second distance and less than or equal to four times the second distance, wherein a width of a region around a light source of the plurality of light sources is based on a distance from a brightest portion of the light source to a point at which a brightness is half of a brightness of the brightest portion, and wherein the width is greater than or equal to the first distance and less than or equal to 1.15 times the first distance.

16. The display apparatus according to claim 15, further comprising:

a bottom chassis comprising a module mounting protrusion and configured to accommodate the reflective sheet, wherein the light source substrate is configured to be mounted on the bottom chassis in a state in which the reflective sheet is mounted on the bottom chassis, wherein the light source substrate comprises:

a passing portion into which the module mounting protrusion is configured to be inserted; and a restricting portion adjacent to the passing portion and configured to restrict detachment of the module mounting protrusion in a state in which the module mounting protrusion is inserted therein, and wherein, in a state in which the module mounting protrusion is inserted into the passing portion, the light source substrate is mounted on the bottom chassis and the module mounting protrusion is inserted into to the restricting portion.

17. The display apparatus according to claim 15, wherein the first distance corresponds to a brightness of at least one light source of the plurality of light sources.

18. A display apparatus comprising:

a reflective sheet comprising an opening;

a bottom chassis configured to accommodate the reflective sheet and comprising a module mounting protrusion configured to insert through the opening;

a light source substrate having at least one through hole through which the mounting protrusion is configured to insert to couple with the light source substrate, the light source substrate comprising a first light source substrate, and a second light source substrate separated from the first light source substrate by a first distance in a first direction; and a plurality of light sources provided on the light source substrate along a second direction that is different from the first direction, wherein a second distance is a distance in the second direction between adjacent light sources of the plurality of light sources, and wherein the first distance is greater than or equal to two times the second distance and less than or equal to four times the second distance, wherein a width of a region around a light source of the plurality of light sources is based on a distance from a brightest portion of the light source to a point at which a brightness is half of a brightness of the brightest portion, and wherein the width is greater than or equal to the first distance and less than or equal to 1.15 times the first distance.

* * * * *